(Model.)

T. PARKS.
SEED SOWER.

No. 252,398. Patented Jan. 17, 1882.

Witnesses:
James P. Parks
Tobias Hetchie

Inventor.
Theodore Parks.

N. PETERS, Photo-Lithographer, Washington, D. C.

UNITED STATES PATENT OFFICE.

THEODORE PARKS, OF FREEDOM, PENNSYLVANIA.

SEED-SOWER.

SPECIFICATION forming part of Letters Patent No. 252,398, dated January 17, 1882.

Application filed May 11, 1881. (Model.)

*To all whom it may concern:*

Be it known that I, THEODORE PARKS, a citizen of the United States, residing at Freedom, in the county of Beaver and State of Pennsylvania, have invented a new Seed-Sower, of which the following is a specification.

My invention relates to a new seed-sower, which is operated by two persons.

The object of my invention is, first, to provide a machine that is substantial, light, and easy to carry; second, that will sow on hilly and uneven ground; third, that is easy to fill and empty and cannot upset and spill the seed. I attain these objects by the mechanism illustrated in the accompanying drawings, in which—

Figure 1:
Figure 1:
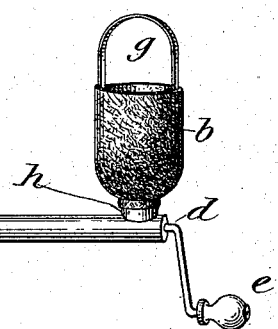
Figure 2:
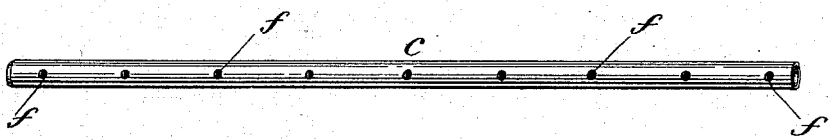
Figure 3:
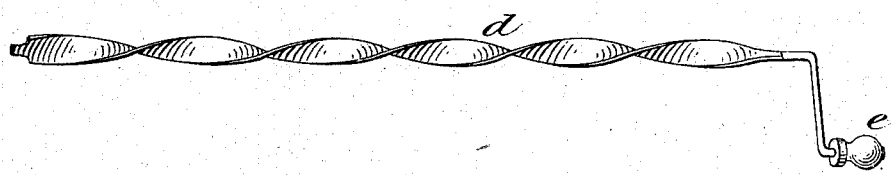

Figure 1 is a view of the entire machine. Fig. 2 is a view of the under side, showing the holes through which the seed is sifted. Fig. 3 is a view of the spiral shaft, which revolves inside the pipe and keeps the seed in motion.

The machine shown in Fig. 1 consists of a pipe, $c$, sixteen feet long, (it can be more or less,) in which the spiral shaft $d$ (shown in Fig. 3) is revolved by means of a crank, $e$. This shaft conveys the seed along the pipe and sifts it out evenly through the small holes $f$ in the under side of pipe $c$. (Shown in Fig. 2.) The seed is fed into the pipe from the sack $a$ through an opening near one end, which is connected with the sack by a short vertical tube, $h$. The surplus seed, when it reaches the end of the pipe, is forced up into sack $b$, which sack, when filled, can be emptied by reversing the motion.

The manner of filling and operating is as follows: One person places the loop $g$ of the sack $a$ over the head, with the other end of the machine resting on the ground, fills sack $a$, and shakes the pipe until it is full. The second person puts on the loop $g$ of sack $b$ and they are ready for work. When one through has been sowed move the length of the sower face about, the first person going back in the tracks made by the second person in the first through.

With this machine two persons can sow forty or fifty acres per day evenly, regardless of weather, thus avoiding those unsightly spots which can be seen in half our meadows.

The machine is regulated to put on an average quantity of seed by giving the crank one turn for every other step. By stepping shorter more seed can be put on; or it can be turned once for every step, thus putting on a double quantity of seed.

The advantages of this machine are that it will feed continuously, thus avoiding the delay and liability to spill the seed in stopping to fill the boxes, (found in other long machines,) as the sack can be filled without removing, and it will sow evenly on hilly ground without the trouble of carrying the machine level, and can be made light, cheap, and durable.

The pipe can be made of wood, iron, or tin; the spiral shaft of iron. A pipe one inch in diameter is large enough for a grass-seed sower sixteen feet long.

The weight of the entire machine does not exceed five pounds.

I am aware that prior to my invention there have been long seed-sowers operated by one and also by two persons; but

What I claim, and desire to secure by Letters Patent, is—

In a hand seeding-machine, the combination of the long perforated tube $c$, the spiral shaft $d$, the crank $e$, and the two sacks $a\, b$, attached to the ends of the tube, and supporting-straps $g\, g$, substantially as described.

THEODORE PARKS.

Witnesses:
JAMES I. PARKS,
TOBIAS HETCHIE.